Nov. 11, 1969    W. L. HUGHES ETAL    3,477,878
DEVICE FOR THE DIRECT CONVERSION OF THERMAL DYNAMIC FREE
ENERGY IN FUEL GASES TO ELECTRICAL ENERGY
Filed Feb. 26, 1965    2 Sheets-Sheet 1

INVENTORS.
WILLIAM L. HUGHES
CLAUDE M. SUMMERS
HANSELL J. ALLISON

ATTORNEYS

Nov. 11, 1969          W. L. HUGHES ETAL                 3,477,878
         DEVICE FOR THE DIRECT CONVERSION OF THERMAL DYNAMIC FREE
              ENERGY IN FUEL GASES TO ELECTRICAL ENERGY
Filed Feb. 26, 1965                                  2 Sheets-Sheet 2

INVENTORS.
WILLIAM L. HUGHES
CLAUDE M. SUMMERS
HANSELL J. ALLISON

ATTORNEYS

United States Patent Office 3,477,878
Patented Nov. 11, 1969

3,477,878
DEVICE FOR THE DIRECT CONVERSION OF THERMAL DYNAMIC FREE ENERGY IN FUEL GASES TO ELECTRICAL ENERGY
William Lewis Hughes, Claude Menta Summers, and Hansell Jack Allison, Stillwater, Okla., assignors to Oklahoma State University of Agriculture & Applied Science, Stillwater, Okla., a corporation of Oklahoma
Filed Feb. 26, 1965, Ser. No. 435,461
Int. Cl. H01m 27/04
U.S. Cl. 136—86
9 Claims

ABSTRACT OF THE DISCLOSURE

This invention relates to a device for the conversion of thermal dynamic free energy in fuel gases to electrical energy. More particularly, the invention relates to a device including a closed chamber with means of introducing a fuel gas in one inlet and an oxidant gas in another inlet, each through a separate electrode means, means of evacuating the chamber through an outlet opening, means of applying a magnetic field across a chamber to which the gases are subjected, and means of raising the energy level of the gases prior to the commingling thereof.

---

This invention relates to fuel cells for the direct conversion of thermodynamic free energy in fuel gases to electrical energy. More particularly, the invention relates to devices for converting fuel energy directly into electrical energy in a fuel cell characterized by an arrangement wherein no electrolyte is required.

Generally, fuel cells are devices for the direct production of electrical energy by the oxidation of a fuel and the reduction of an oxidant. Known types of fuel cells have a fuel electrode and an oxidant electrode mounted in spaced relationship within a housing. Normally a catalyst is required on each of the two electrodes for the purpose of assisting the fuel gas ionization process. An electrolyte is required which, among other things, supports the conduction of ions. One of the primary difficulties with known types of fuel cells is the fact that suitable catalysts are generally expensive and efficient electrolytes are highly corrosive.

It is an object of this invention to provide a fuel cell wherein the functions of the catalyst and electrolyte are replaced by electric and magnetic fields.

Another object of this invention is to provide fuel cells having a fuel electrode and an oxidant electrode spaced from each other within an evacuated container and including means of raising the energy level of fuel and oxidant gases at each electrode to achieve ionization.

Another object of this invention is to provide fuel cells having a fuel electrode and an oxidant electrode in spaced relationship in an evacuated container, including means of raising the energy level of gases introduced at each of the electrodes to the ionization level, and including a magnetic field between and parallel the electrodes to prevent direct electron flow therebetween.

A more specific object of this invention is to provide fuel cells having an evacuated enclosure, a first and second spaced apart electrode within such enclosure, means to introduce fuel gas at one of the electrodes and oxidant gas at the other, means of raising the energy level of each electrode to the ionization level, and a magnetic field between the electrodes to prevent the flow of electrons within the enclosure from one electrode to the other.

These and other objects of this invention will be better understood by referring to the following description and claims taken in conjunction with the attached drawings in which:

This invention may be described as a fuel cell. More particularly, but not by way of limitation, the invention may be described as a fuel cell having an evacuated enclosure having a fuel gas inlet and an oxidant gas inlet therein, spaced apart electrode screens mounted within the enclosure, one of said screens positioned to receive the flow of fuel gas therethrough and the other to receive the flow of oxidant gas therethrough, means providing a magnetic field between said electrodes to retard the passage of electrons therebetween, and means of raising the energy level of said electrodes to the ionization level of the fuel and oxidant gases.

Figure 1:
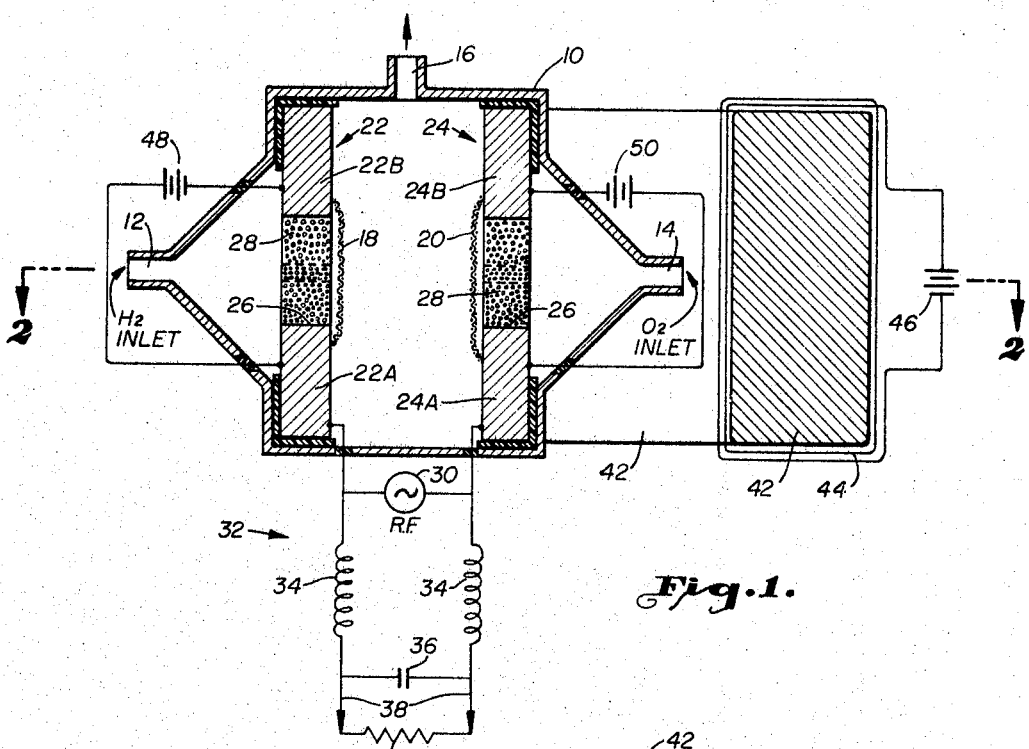
FIGURE 1 is a diagrammatic cross-sectional representation of a fuel cell of this invention.

Referring now to the drawings in detail, and first to FIGURE 1, a diagrammatic representation of one embodiment of the fuel cell of this invention is shown. The cell consists of an enclosure 10 having three openings therein, that is, a fuel gas inlet 12, an oxidant gas inlet 14, and an outlet 16. The outlet 16 is connected to a vacuum system, not shown, so that the enclosure 10 is substantially evacuated.

Positioned within the enclosure 10 in spaced relationship is a fuel gas electrode screen 18 and an oxidant gas electrode screen 20. Although the electrodes 18 and 20 may be formed in a variety of ways, the embodiment shown includes the provision of electrode plates 22 and 24 which may be in the form of metal discs each having a central opening 26 therein. Positioned within the opening 26 in each of the plates 22 and 24 is a porous ceramic element 28. Gas passing into inlets 12 and 14 is diffused as it passes through the porous ceramic element 18 so that diffused gas passes into the interior of the enclosure 10 through electrode screens 18 and 20.

A radio frequency (RF) energy source 30 is connected between the electrode plates 22 and 24 so that RF energy is applied to the screen electrodes 18 and 20. A load circuit, generally indicated by the numeral 32, is connected between the plates 22 and 24. The load circuit 32 basically consists of filters 34 (inductive elements) and a capacitor 36. The electrical energy output of the fuel cell is taken across conductors 38, the load being indicated by resistor 40.

Positioned exteriorly of the enclosure 10 is a magnet 42 which may be of the permanent type or, as shown, of the electromagnetic type energized by a coil 44 from an electrical energy source 46.

Method of operation

As fuel gas, such as hydrogen, enters the enclosure 10 through opening 12, it is diffused through the porous ceramic element 28 and passes as a diffused gas through the fuel gas electrode screen 18. At the same time, oxidant gas, such as oxygen, entering the enclosure through inlet opening 14, is diffused by porous ceramic element 28 and passes through oxidant gas electrode screen 20. The energy level of both gases is raised as they pass through the screen electrodes 18 and 20 by the RF energy applied from source 30. Ionization of the gases makes available free electrons, however, the electrons are forbidden to travel across the open space within the enclosure 10 between the screens 18 and 20 by the field imposed by magnet 42. The ions created by the ionization, however, having a much lower charge-to-mass ratio, can travel the path quite easily, and do so.

In order that there be achieved a coulomb balance, which there must, the electron travel must take place in another path and this is provided by conductors 38. Thus, the electron flow or electrical energy produced by the cell is carried through conductors 38 to load 40.

The load circuit 32 is provided with filter elements 34 and 36 so that no RF energy is transmitted to the load 40.

Alternate embodiments

It can be seen that the magnetic field lies between and parallel to the electrode screens 18 and 20. According to the quantum theory there is no indication that the ionization potential of fuel gases is changed appreciably by intense magnetic fields. However, it has been learned that when an intense magnetic field is applied perpendicularly to the applied radio frequency or RF field, as is the case in FIGURES 1 and 2, ionization occurs much more easily. It is thought that this is attributed to the fact that under these field alignment conditions, deionization of the gas atom releases a photon in a direction which is apt to strike, and ionize, another gas atom rather than strike an electrode. This being the case, it is apparent that electrode structures may be built to take advantage of this fact to recapture deionization energy.

According to the principle of this invention, the energy level of the fuel and oxygen gases is required to be raised at the screen electrodes to the ionization potential of the gases. This can be achieved, as in the primary example, by the use of RF energy applied between the spaced electrodes. Another method is the use of thermal energy to raise the ionization potential. This may be achieved by heating the screen electrodes 18 and 20 to the ionization potential of the fuel and oxidant gases. An example of this is illustrated in FIGURE 1. For this purpose the electrode plates 22 and 24 are separated into two elements designated 22 A and 22 B and 24 A and 24 B. Thereby the screen electrodes 18 and 20 extend electrically between the A and B portions of each of the electrode plates 22 and 24. Thermal energy may be applied electrically such as by means of source 48 and 50 to heat the electrodes 18 and 22 to the ionization potential. While such an electrical means is disclosed to raise the electrode potentials to the ionization level, any other means of obtaining the necessary ionization energy level is within the purview of this invention.

Figure 2:
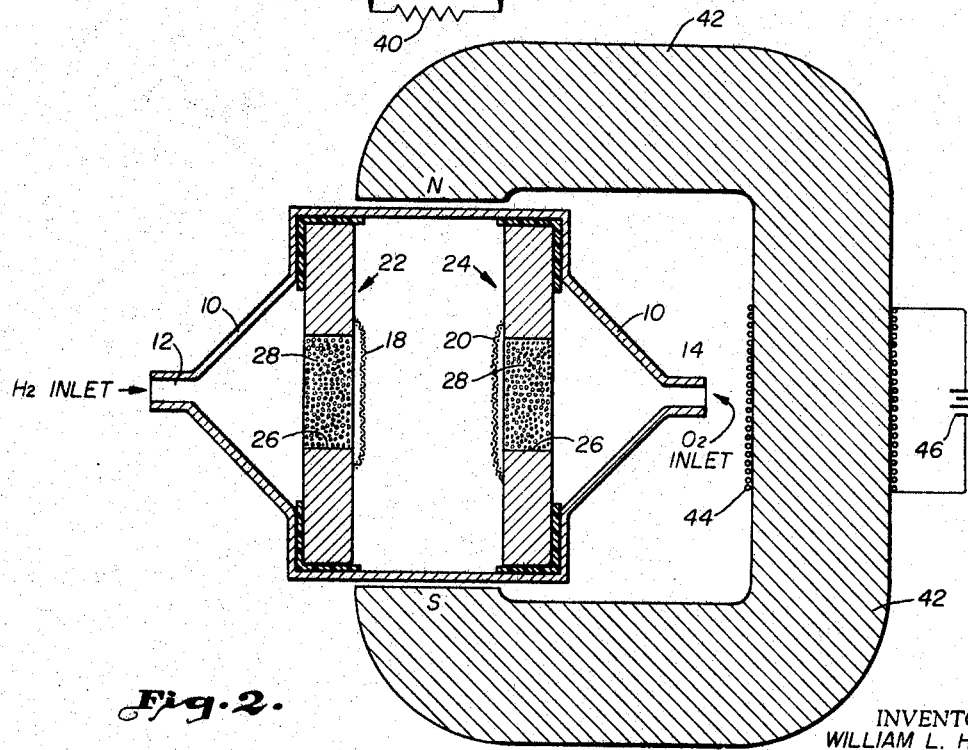
FIGURE 2 is a cross-sectional view taken along the line 2—2 of FIGURE 1.

Two separate means of creating the necessary ionization energy are thus illustrated in FIGURES 1 and 2, first, RF energy source 30 and, second, electrical thermal energy source 48 and 50. In still a different embodiment both the RF energy and the thermal energy sources may be cojointly utilized.

Figure 3:
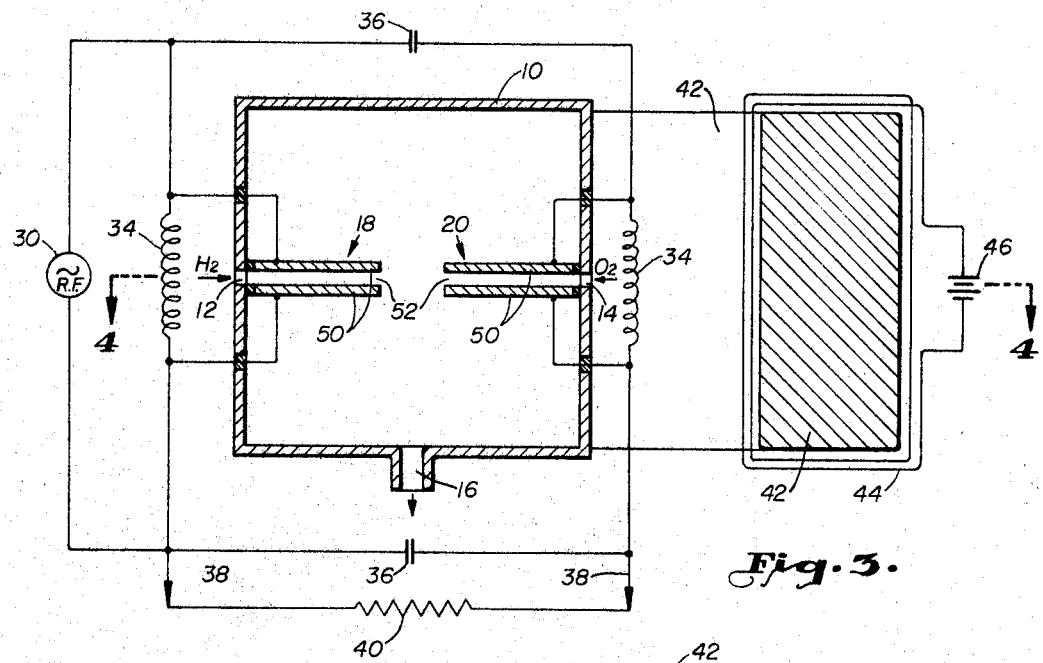
FIGURE 3 is a diagrammatic cross-sectional representation of an alternate embodiment of the fuel cell of this invention.
Figure 4:
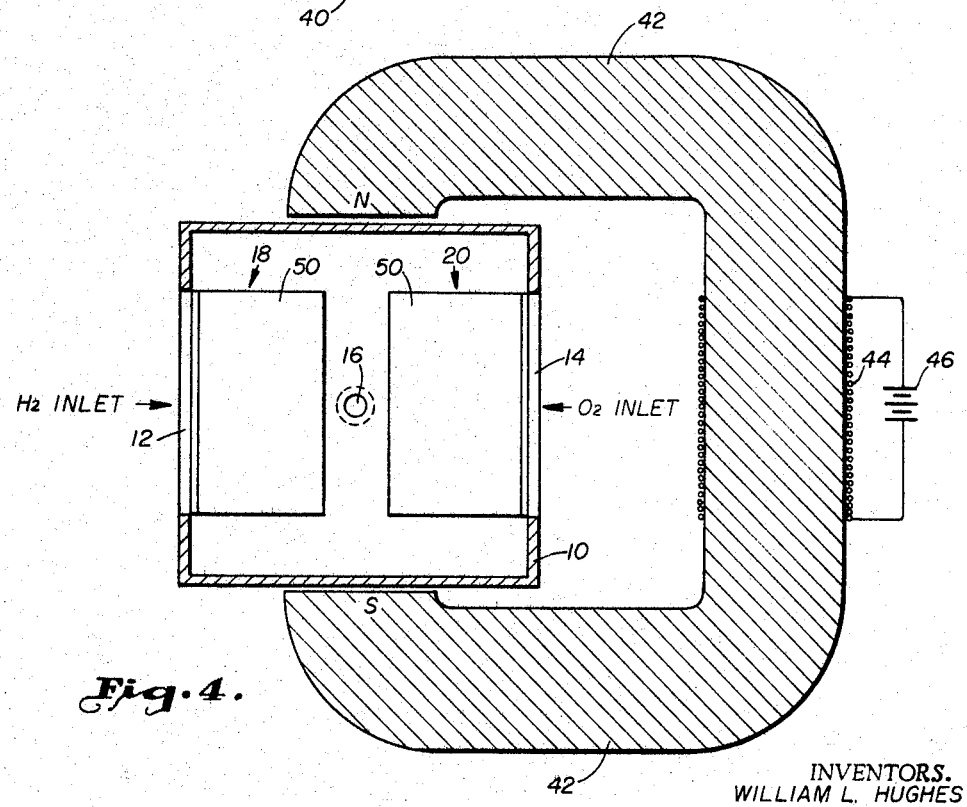
FIGURE 4 is a cross-sectional view taken along the line 4—4 of FIGURE 3.

An alternate embodiment of the invention is shown in FIGURES 3 and 4. In this arrangement, electrodes 18 and 20 are replaced by thin paralleled plate members 50, each providing narrow slits 52 therebetween. Gases enter the enclosure 10 through inlet openings 12 and 14 as previously described except in this case the gas is diffused through the slits 52. Energy from RF source 30 is applied between plates 50 of each of the electrodes 18 and 20. The magnetic field between the electrodes 18 and 20 is created, as previously described, by magnet 42.

In the arrangement of FIGURES 3 and 4, the ion path, that is, within the enclosure between electrodes 18 and 20, the magnetic field created by magnet 42, and the RF field between plates 50 are all mutually perpendicular to each other. The arrangement of FIGURES 3 and 4 is illustrative that the ions are not pulled from one electrode to the other by the RF field since this field exists between elements of each electrode.

In the embodiment of FIGURES 3 and 4, only the RF energy method is shown as means of raising the energy level of each electrode to the ionization potential, it being understood that other means of achieving the ionization energy level at each electrode is within the scope of this invention.

In general, this invention discloses a method of creating a fuel cell action using neither a catalyst nor an electrolyte and in a system in which the ionization achieved either through radio frequency (RF) energy, thermal energy, or by other appropriate means, produces ion flow accomplished through the use of magnetic fields. The fuel cell has the obvious advantage of the elimination of expensive catalysts and corrosive electrolytes.

An additional novel feature of this invention is the combination of the use of thermal or RF ionization force at each electrode coupled with a magnetic field in an arrangement wherein deionization produced photons which create further ionization for increased efficiency of the cell action.

Although this invention has been described with a certain degree of particularity, it is manifest that many changes may be made in the details of construction and arrangement of components without departing from the spirit and scope of this disclosure.

What is claimed is:

1. A device for the conversion of thermal dynamic free energy of fuel gases to electrical energy comprising:
    a closed chamber having an outlet opening, a fuel gas inlet opening and an oxidant gas inlet opening therein, said openings spaced from each other;
    a first electrode within said chamber positioned adjacent said fuel gas inlet opening to receive the flow of fuel gas therethrough;
    a second electrode within said chamber spaced from said first electrode, said second electrode positioned adjacent said oxidant gas inlet opening to receive the flow of oxidant gas therethrough;
    means to evacuate said chamber through said outlet opening;
    conductors affixed to each of said electrodes and extending externally of said chamber;
    means applying a magnetic field between and parallel said electrodes; and
    means of raising the energy level of said gases at said electrodes.

2. A device according to claim 1 wherein said means of raising the energy level of gases at said electrodes includes radio frequency energy.

3. A device according to claim 1 wherein said means of raising the energy level of fuel gases at said electrodes includes thermal energy.

4. A device according to claim 1 wherein said means of raising the energy level of gases at said electrodes includes the application concommitantly of thermal and radio frequency energy.

5. A device for the conversion of thermal dynamic free energy in fuel gases to electrical energy comprising:
    an evacuated enclosure having a fuel gas inlet and an oxidant gas inlet therein;
    spaced apart electrodes therein, one of said electrodes positioned to receive the flow of fuel gas therethrough and the other to receive the flow of oxidant gas therethrough;
    means of providing a magnetic field between said electrodes to retard the passage of electrons therebetween; and
    means of raising the energy level of said electrodes to the ionization level of the fuel and oxidant gases.

6. A device according to claim 5 wherein said means of raising the energy level of said electrodes includes applying radio frequency electrical energy between said electrodes.

7. A device according to claim 5 wherein said means of raising the energy level of said electrons includes electrical means of heating said electrodes to raise the thermal energy level thereof.

8. A device according to claim 5 wherein said electrodes are of a metallic screen configuration receiving the flow of gases therethrough.

9. A device according to claim 8 including diffusing means in the path of flow of said gases, said diffusing means positioned adjacent each of said metallic screen electrodes whereby said gas is diffused as it flows through said metallic screen electrode.

References Cited
UNITED STATES PATENTS

| | | | |
|---|---|---|---|
| 3,133,212 | 5/1964 | Szekeley | 310—4 |
| 3,176,166 | 3/1965 | Gunther et al. | 310—4 |
| 3,120,621 | 2/1964 | Gunther et al. | 310—4 |
| 1,128,229 | 2/1915 | Comstock | 310—4 |

WINSTON A. DOUGLAS, Primary Examiner

M. J. ANDREWS, Assistant Examiner

U.S. Cl. X.R.

310—4